United States Patent
Dalbey

[15] 3,697,599
[45] Oct. 10, 1972

[54] PROCESS FOR PREPARING 2-HYDROXY-4-ALKOXYBENZOPHENONE

[72] Inventor: Theodore E. Dalbey, Monroeville, Pa.

[73] Assignee: Pennsylvania Industrial Chemical Corporation

[22] Filed: June 24, 1968

[21] Appl. No.: 739,138

[52] U.S. Cl. .................................................260/591
[51] Int. Cl. .................................................C07c 49/82
[58] Field of Search.....................................260/591

[56] References Cited

UNITED STATES PATENTS

| | | | |
|---|---|---|---|
| 2,205,395 | 6/1940 | Coleman................ | 260/612 D |
| 2,976,259 | 3/1961 | Hardy et al............. | 260/591 |
| 2,861,053 | 11/1958 | Lappin et al............ | 260/591 |
| 2,962,533 | 11/1960 | Hardy et al............. | 260/591 |

OTHER PUBLICATIONS

Foster, Inorganic Chemistry For Colleges, page 279 (1936).
Larin et al; Chem. Abstracts 57 14990i– 14991a (1962).
McCutcheon, Synthetic Detergents, page 273, (1950) MacNair-Dorland Co. Publishers.

*Primary Examiner*—Daniel D. Horwitz
*Attorney*—Buell, Blenko & Ziesenheim

[57] ABSTRACT

A process for preparing 2-hydroxy-4-alkoxybenzophenone by alkylating 2,4 dihydroxybenzophenone with an alkyl halide in an aqueous solution of an alkali metal hydroxide in the presence of a surfactant.

10 Claims, No Drawings

PROCESS FOR PREPARING 2-HYDROXY-4-ALKOXYBENZOPHENONE

This invention relates to a process for preparing 2-hydroxy-4-alkoxybenzophenones characterized by the formula:

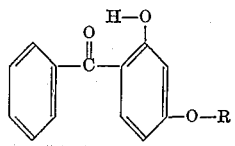

where R is alkyl. These compounds have found wide application as ultraviolet light absorbers in polymers such as polypropylene, polyethylene and polystyrene.

2-hydroxy-4-alkoxybenzophenone commonly has been prepared in several ways. One method is by utilizing the Friedel-Craft type of reaction in which an appropriate dialkoxybenzene is reacted with the proper benzoyl chloride in the presence of a catalyst. Alkoxy groups ortho to the carbonyl in the benzophenone ring are normally dealkylated during the reaction. A limitation upon this reaction is that dealkylation of the ortho alkoxy groups occurs only when these groups are lower alkoxyls such as methoxy or ethoxy. Higher alkoxy groups are not readily dealkylated by this process.

Other methods for preparing 2-hydroxy-4-alkoxybenzophenone are based upon the selective reactivity of the para hydroxyl group in polyhydroxybenzophenones wherein the para hydroxy group may be selectively etherified. The etherifying reagents used in these techniques may be dialkyl sulfates such as dimethyl sulfate or diethyl sulfate; higher alkyl halides such as hexyl-, octyl-, nonyl- and lauryl-chlorides and hexyl-, octyl-, nonyl, and laurylbromides; and the like. The expression "higher alkyl halides" is employed herein to refer to the alkyl radicals having at least three carbon atoms. Methyl- and ethylhalides are gaseous at room temperatures and are not considered practicable for use in the processes herein described without the use of special pressurized apparatus.

One of the etherification methods referred to above involves the reaction of 2,4-dihydroxybenzophenone with alkyl halide and potassium carbonate in an organic solvent such as acetone or alcohol. The shortcomings of this process include the requirement of extended reaction time, the loss of large amounts of solvent, and the low yields of product obtained.

I have discovered that 2-hydroxy-4-alkoxybenzophenones of high purity can be produced in an aqueous solution by adding a surfactant to the reaction mixture. The yields achieved by this step are markedly increased over those obtained by the processes described above.

I provide a process for preparing 2-hydroxy-4-alkoxybenzophenone comprising the steps of reacting, 2,4-dihydroxybenzophenone with an alkyl halide in an aqueous solution of an alkali metal hydroxide in the presence of a surfactant; and separating the product formed from the reaction mixture. I prefer that the alkyl halide have at least three carbon atoms per molecule. I further prefer to provide that the solution of an alkali metal hydroxide comprises a solution of potassium hydroxide having a concentration ranging between 20 and 45 percent by weight.

Preferably, the surfactant which I employ in my invention is selected from the group consisting of: nonylphenoxypoly(ethyleneoxy)$_6$ethanol; nonylphenoxypoly(ethyleneoxy)$_{8-9}$ethanol; nonylphenoxypoly(ethyleneoxy)$_9$ethanol; nonylphenoxypoly(ethyleneoxy)$_{12}$ethanol; dialkylphenoxypoly(ethyleneoxy)$_9$ethanol; sodium nonylphenoxypoly(ethyleneoxy)ethanol sulfate; sodium dodecylbenzenesulfonate; soya trimethylammonium hydroxide; 2-amino-2-methyl-1,3-propanediol; and 2-amino-2ethyl-1,3-propanediol.

In carrying out the process of my invention, a polyhydroxybenzophenone such as 2,4-dihydroxybenzophenone, a higher alkyl halide such as octyl bromide ($C_8H_{17}Br$), an alkali metal hydroxide such as potassium hydroxide (KOH), water and surfactant are mixed together in a suitable vessel. The mixture is heated, preferably to boiling (approximately 111° C. for the specific compounds mentioned above), with stirring and the temperature of the reaction mixture is maintained under reflux for about eight hours. Improved results have been noted at temperatures as low as 75° C. The resulting mixture is cooled below about 100° C. and quenched with water.

The upper layer of the reaction mixture is an oil phase which floats upon the water phase below. The upper layer, containing both product and any unreacted alkyl halide, is separated from the water phase and dissolved in a low boiling alcohol such as isopropanol. The product, 2-hydroxy-4-octoxybenzophenone, crystallizes as the temperature decreases and is recovered by filtration. One crystallization is sufficient to yield a product of high purity and free of contaminants. The unreacted alkyl halide remains dissolved in the alcohol. An alkali metal halide is formed as a by-product of the process of the invention but remains dissolved in the water phase of the reaction mixture and is therefore non-interfering.

Upon mixing of the starting materials recited above, a two phase system is formed in the reaction vessel. The lower phase contains an alkali metal salt of the 2,4-dihydroxybenzophenone dissolved in water. The upper phase is an oily liquid consisting of alkyl halide. The addition of a surfactant in accordance with the process of the invention is believed to cause a reduction of the surface tension of the alkyl halide globules which constitute the oil phase and thereby enhance the contact between the reactants. The mechanism by which the surfactant operates in my invention is believed to be as follows, however, I do not wish to be bound by any particular theory of operation: The surfactant is soluble in the water phase; a projection of the surfactant molecule apparently extends into the organic phase and operates to reduce the surface tension of the organic globules. In the present invention, it has been found that the higher the alkyl group attached to the surfactant chain, the greater the tendency of the molecule to reach into the alkyl halide phase and hence the greater the compatibility between the phases.

Surfactants having ethyleneoxy chains and characterized by the formula:

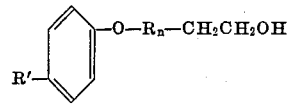

(wherein R is an ethyleneoxy radical of the formula (—CH$_2$CH$_2$O—), R' is alkyl having at least six carbon atoms and n is six or greater) were found to be particularly effective among the nonionic surfactants.

Table I below illustrates the increase in yield obtained by the process of the invention over the yield obtained with the same reaction but without the addition of a surfactant.

TABLE I

| Reaction Period | Temperature of Reaction | Surfactant | Yield |
|---|---|---|---|
| 8 hrs. | 111°C | Yes | 82.3% |
| 8 hrs. | 111°C | No | 18.9% |
| 16 hrs. | 111°C | Yes | 84.7% |
| 16 hrs. | 111°C | No | 22.9% |

The data in Table I were compiled by using the starting materials and processing conditions set forth above. Yields are expressed in terms of percentage of the theoretical yield obtainable from the amounts of starting materials. They show that the use of the surfactant in the reaction mixture not only increases yield but also reduces the required reaction period.

Table II below illustrates the relative effectiveness of a number of different surfactants upon the yield of product. The data in Table II were obtained by the same conditions as described for Table I.

TABLE II

| Surfactant | Yield |
|---|---|
| nonylphenoxypoly(ethyleneoxy)ethanol 8-9 | 81.7% |
| nonylphenoxypoly(ethyleneoxy)ethanol 12 | 72.0% |
| sodium nonylphenoxypoly(ethyleneoxy) ethanol sulfate | 68.5% |
| nonylphenoxypoly(ethyleneoxy)ethanol 9 | 67.5% |
| 2-amino-2-methyl-1,3-propanediol | 67.4% |
| nonylphenoxypoly(ethyleneoxy)ethanol 6 | 65.0% |
| dialkylphenoxypoly(ethyleneoxy)ethanol 9 | 62.6% |
| 2-amino-2-ethyl-1,3-propanediol | 46.0% |
| sodium dodecylbenzenesulfonate | 40.4% |
| soya trimethylammonium hydroxide | 33.6% |

It has been found that the concentration of the aqueous solution of alkali metal hydroxide has an effect upon the yield of the product obtained. Table III below illustrates that effect. The data for Table III were obtained by using the process described above wherein the alkali metal solution was potassium hydroxide.

TABLE III

| Potassium Hydroxide Concentration (percent by weight) | Yield (percent of theoretical) |
|---|---|
| 10% | 40.8% |
| 20% | 72.3% |
| 40% | 77.8% |
| 42.5% | 80.1% |
| 45% | 72.4% |
| 50% | 62.0% |

The following examples will serve to illustrate the practice of my invention. The examples are not intended to limit the invention, however, for there are numerous possible variations and modifications.

EXAMPLE I

1-Bromooctane, 40.3 g., 2,4-dihydroxybenzophenone, 42.8 g., potassium hydroxide (85 percent pellets) 12.4 g., water 12.4 g. and surfactant are stirred and heated under reflux for 8 hours. Water, 50 g., is added and the unreacted octyl bromide is removed by codistillation with water. The water layer of the distillate is returned to the reaction mixture. The organic layer of the residue is separated and crystallized from isopropanol to give 2-hydroxy-4-octyloxybenzophenone in 85 percent yield. (55.7 g.)

EXAMPLE II

1 Chlorooctane, 31.2 g., 2,4-dihydroxybenzophenone, 42.8 g., potassium hydroxide, 85 percent pellets, 12.4 g., water, 12.4 g., and surfactant, 5.0 g., are stirred and heated under reflux for eight hours. Water, 50 g., is added. The organic layer is separated and crystallized from isopropanol to give 2-hydroxy-4-octyloxybenzophenone in 50 percent yield. (32.8 g.)

I claim:

1. A process for preparing 2-hydroxy-4-alkoxybenzophenone comprising the steps of
    A. reacting 2,4-dihydroxybenzophenone with an alkyl halide selected from the group consisting of alkyl bromide and alkyl chloride in an aqueous solution of an alkali metal hydroxide in the presence of a surfactant; and
    B. separating the product formed from the reaction mixture.

2. A process for preparing 2-hydroxy-4-alkoxybenzophenone as recited in claim 1 in which the alkyl halide has at least three carbon atoms per molecule.

3. A process for preparing 2-hydroxy-4-alkoxybenzophenone as recited in claim 1 wherein said solution of alkali metal hydroxide is a solution of potassium hydroxide having a concentration ranging between 20 and 45 percent by weight.

4. A process for preparing 2-hydroxy-4-alkoxybenzophenone as recited in claim 1 in which the surfactant is selected from the group consisting of: nonylphenoxypoly-(ethyleneoxy)$_6$ethanol; nonylphenoxypoly(ethyleneoxy)$_{8-9}$ethanol; nonylphenoxypoly(ethyleneoxy)$_9$ethanol; nonylphenoxypoly-(ethyleneoxy)$_{12}$ethanol; dialkylphenoxypoly(ethyleneoxy)$_9$ethanol; sodium nonylphenoxypoly(ethyleneoxy)ethanol sulfate; sodium dodecylbenzenesulfonate; soya trimethylammonium hydroxide; 2-amino-2-methyl-1,3-propanediol; and 2-amino-2 ethyl-1,3-propanediol.

5. A process for preparing 2-hydroxy-4-alkoxybenzophenone as recited in claim 1 wherein the surfactant is nonylphenoxypoly(ethyleneoxy)$_{8-9}$ethanol.

6. A process for preparing 2-hydroxy-4-alkoxybenzophenone as recited in claim 1 wherein the surfactant is nonylphenoxypoly(ethyleneoxy)$_{12}$ethanol.

7. A process for preparing 2-hydroxy-4 alkoxybenzophenone as recited in claim 1 wherein the surfactant is sodium nonylphenoxypoly(ethyleneoxy)ethanol sulfate.

8. A process for preparing 2-hydroxy-4 alkoxybenzophenone as recited in claim 1 wherein the surfactant is nonylphenoxypoly(ethyleneoxy)$_9$ethanol.

9. A process for preparing 2-hydroxy-4 alkoxybenzophenone as recited in claim 1 wherein the surfactant is nonylphenoxypoly(ethyleneoxy)$_6$ethanol.

10. A process for preparing 2-hydroxy-4-alkoxybenzophenone comprising the steps of
   A. reacting 2,4-dihydroxybenzophenone with alkyl chloride in an aqueous solution of an alkali metal hydroxide in the presence of a surfactant; and
   B. separating the product formed from the reaction mixture.

* * * * *